(12) United States Patent
Fattepur et al.

(10) Patent No.: US 11,357,171 B2
(45) Date of Patent: Jun. 14, 2022

(54) HARVESTING MACHINE INCLUDING A CROP RESIDUE DEFLECTOR

(71) Applicant: DEERE & COMPANY, Moline, IL (US)

(72) Inventors: Surfraj Fattepur, Bijapur, IN (US); Matthew J. Hansen, Thibodaux, LA (US); Todd J. Rodrigue, Thibodaux, LA (US)

(73) Assignee: DEERE & COMPANY, Moline, IL (US)

( * ) Notice: Subject to any disclaimer, the term of this patent is extended or adjusted under 35 U.S.C. 154(b) by 297 days.

(21) Appl. No.: 16/752,869

(22) Filed: Jan. 27, 2020

(65) Prior Publication Data

US 2021/0227751 A1    Jul. 29, 2021

(51) Int. Cl.
| | |
|---|---|
| *A01D 45/10* | (2006.01) |
| *F16M 1/04* | (2006.01) |
| *F04D 29/40* | (2006.01) |
| *F04D 29/54* | (2006.01) |
| *A01F 12/44* | (2006.01) |

(Continued)

(52) U.S. Cl.
CPC ............ *A01D 45/10* (2013.01); *A01D 43/00* (2013.01); *A01D 45/003* (2013.01); *A01F 12/444* (2013.01); *B07B 11/00* (2013.01); *F04D 29/403* (2013.01); *F04D 29/541* (2013.01);

(Continued)

(58) Field of Classification Search
CPC ...... A01D 45/10; A01D 43/00; A01D 45/003; A01D 75/00; A01F 12/444; B07B 11/00; F04D 29/403; F04D 29/541; F16H 57/043; F16M 1/04; F16M 2200/06

See application file for complete search history.

(56) References Cited

U.S. PATENT DOCUMENTS 3,830,046 A * 8/1974 Rollitt .................... A01D 45/10
                                                    56/16.5
4,555,896 A * 12/1985 Stiff ....................... A01D 45/10
                                                    56/13.9

(Continued)

FOREIGN PATENT DOCUMENTS

| CN | 109209963 A | * | 1/2019 | ........... F04D 19/002 |
| CN | 111133888 A | * | 5/2020 | .............. A01F 11/00 |

(Continued)

*Primary Examiner* — Arpad Fabian-Kovacs
(74) *Attorney, Agent, or Firm* — Taft Stettinius & Hollister LLP; Stephen F. Rost

(57) ABSTRACT

A sugarcane harvester for harvesting sugarcane including a cutter configured to cut sugarcane into a sugarcane mat and a primary extractor disposed adjacent to the sugarcane mat configured to remove crop residue from the sugarcane mat. An elevator includes a conveyor to move the sugarcane mat to an end of the conveyor and an extractor is operatively connected to the elevator. The extractor includes a fan housing having an arm extending laterally from a sidewall of the fan housing and toward a center of the fan housing. A fan assembly is supported by the arm and is configured to remove crop residue from the sugarcane mat at the end of the conveyor. A cover assembly is fixedly connected to the support arm and subtends a fan of the fan assembly and a portion of the support arm, wherein the cover assembly directs crop debris away from the fan and the support arm.

20 Claims, 4 Drawing Sheets

(51) Int. Cl.
*A01D 45/00* (2018.01)
*A01D 43/00* (2006.01)
*B07B 11/00* (2006.01)
*F16H 57/04* (2010.01)

(52) U.S. Cl.
CPC ............ *F16H 57/043* (2013.01); *F16M 1/04* (2013.01); *F16M 2200/06* (2013.01)

(56) References Cited

U.S. PATENT DOCUMENTS

| | | | |
|---|---|---|---|
| 5,092,110 A * | 3/1992 | Dommert | A01D 45/10 209/139.1 |
| 9,456,547 B2 | 10/2016 | Cazenave et al. | |
| 10,076,076 B2 | 9/2018 | Craig et al. | |
| 10,999,972 B2 * | 5/2021 | Hansen | A01D 43/086 |
| 2004/0224735 A1 * | 11/2004 | Hinds | A01D 45/10 460/70 |
| 2015/0327438 A1 * | 11/2015 | Cazenave | A01D 45/10 56/51 |
| 2017/0108000 A1 * | 4/2017 | Junior | F04D 29/384 |
| 2018/0116114 A1 * | 5/2018 | Craig | A01D 45/10 |
| 2019/0350136 A1 * | 11/2019 | Craig | F16M 1/04 |
| 2020/0386268 A1 * | 12/2020 | Reiners | A01D 45/10 |

FOREIGN PATENT DOCUMENTS

| | | | | |
|---|---|---|---|---|
| WO | WO-0032026 A1 * | 6/2000 | | B07B 4/00 |
| WO | WO-2016008016 A1 * | 1/2016 | | F04D 29/325 |
| WO | WO-2020241394 A1 * | 12/2020 | | A01D 45/10 |

* cited by examiner

HARVESTING MACHINE INCLUDING A CROP RESIDUE DEFLECTOR

FIELD OF THE DISCLOSURE

The present invention generally relates to a harvesting machine, and more particularly to a system and method for harvesting sugarcane with a sugarcane harvesting machine.

BACKGROUND

Agricultural equipment, such as a tractor or a self-propelled harvester, includes mechanical systems, electrical systems, hydraulic systems, and electro-hydraulic systems, configured to prepare fields for planting or to harvest crops.

Harvesters of various configurations, including sugarcane harvesters, have harvesting systems of various types. Harvesting systems for a sugarcane harvester, for example, include assemblies or devices for cutting, chopping, sorting, transporting, and otherwise gathering and processing sugarcane plants. Typical harvesting assemblies, in different embodiments, include a base cutter assembly (or "base cutter"), feed rollers, and cutting drums.

To actively harvest crops, the sugarcane harvester gathers and processes material from rows of sugarcane plants. In the case of one type of sugarcane harvester, the gathered sugarcane stalks are cut into billets that move through a loading elevator to an elevator discharge, where the cut sugarcane stalks are discharged to a collector, such as the sugarcane wagon. Leaves, trash, and other debris are separated from the billets and ejected onto the field.

In various harvesters, harvesting assemblies are hydraulically powered by an engine-driven pump or electrically powered by a generator or other electrical power supply. The harvesting assemblies include rotating drums that move the cut stalks toward a chopper. The rotating drums are driven by a hydraulic motor or an electric motor that rotationally drives the roller to continuously move the billets to the wagon or other container. The motors include splines that engage the roller to drive the roller about a rotation axis.

The sugarcane, once cut, forms what is known as a "mat" of sugarcane. The sugarcane harvester feeds the mat to a chopping section where it is chopped, including the stalk which is cut into segments. The sugarcane harvester advances the billets along with crop residue (e.g., leafy material) to a primary extractor that separates at least a portion of the crop residue from the billets and removes the crop residue from the sugarcane harvester. However, some crop residue can remain with the billets as the billets travel up the elevator for discharge into a wagon or other container to be hauled away. In different embodiments, the sugarcane harvester includes a secondary extractor that separates crop residue from the billets and discharges the separated crop residue from the sugarcane harvester. The secondary extractor include a fan assembly including a motor and blade to discharge the crop residue from the harvester to the ground or to a collection wagon. In some embodiments, however, the crop residue collects at the fan assembly, which if not cleared, reduces air flow generated by the fan assembly that is needed to discharge the crop residue from the secondary extractor.

What is needed therefore is a sugarcane harvester including a harvesting system having a secondary extractor with improved airflow though the secondary extractor for removing crop residue from the billets.

SUMMARY

In one embodiment, there is provided a separator for a crop harvester configured to harvest sugarcane including a frame having an inlet and an outlet, wherein the inlet is configured to receive a sugarcane mat and the outlet is configured to receive crop debris. A support arm extends laterally from the frame, wherein the support arm includes an aperture located at the frame. A fan assembly is operatively connected to the support arm, wherein the fan assembly includes a fan blade and a rotary actuator to drive the fan blade. A cover is fixedly connected to the support arm and subtends the rotary actuator, wherein the cover directs crop debris away from the rotary actuator.

In another embodiment, there is provided a sugarcane harvester for harvesting sugarcane including a cutter configured to cut sugarcane into a sugarcane mat and a primary extractor disposed adjacent to the sugarcane mat configured to remove crop residue from the sugarcane mat. An elevator includes a conveyor to move the sugarcane mat to an end of the conveyor and an extractor is operatively connected to the elevator. The extractor includes a fan housing having an arm extending from a sidewall of the fan housing and toward a center of the fan housing. A fan assembly is supported by the arm and is configured to remove crop residue from the sugarcane mat at the end of the conveyor.

In a further embodiment, there is provided a method of harvesting sugarcane from a field of sugarcane with a sugarcane harvester. The method includes: cutting sugarcane from the field to obtain a sugarcane mat of cut stalk and crop residue; delivering the cut stalk and the crop residue to a fan housing of the sugarcane harvester; supporting a fan with an arm extending from the fan housing of the sugarcane harvester and toward a center of the fan housing; providing an air flow of increased velocity from the nozzle and through the fan housing with a fan to remove the crop residue from the sugarcane mat; and directing the crop residue away from the fan with a cover assembly subtending the fan.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

DETAILED DESCRIPTION

Figure 1:
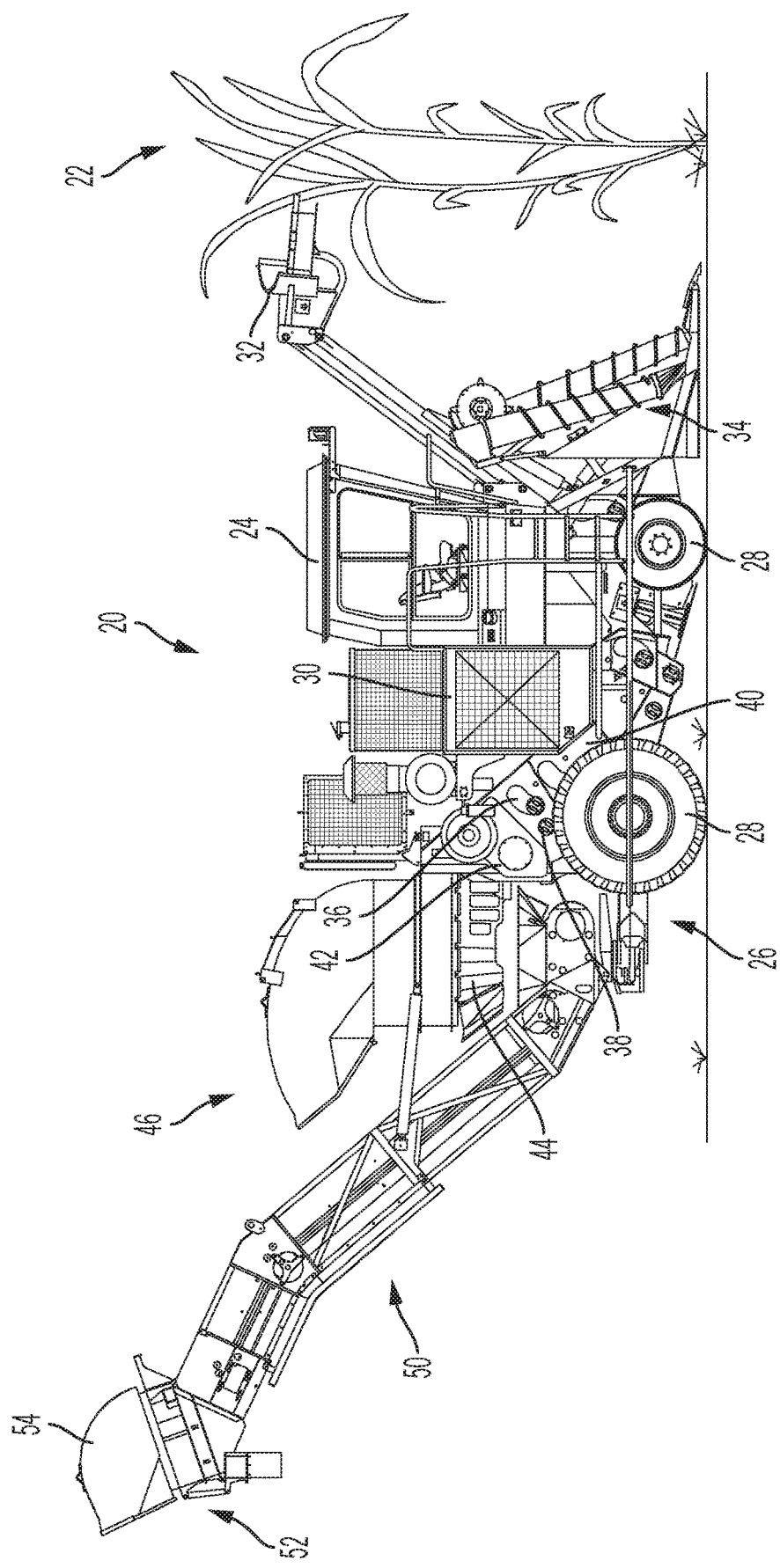
FIG. 1 illustrates a side elevational view of a work vehicle, and more specifically, of an agricultural vehicle such as a sugarcane harvesting machine.

For the purposes of promoting an understanding of the principles of the novel invention, reference will now be made to the embodiments described herein and illustrated in the drawings and specific language will be used to describe the same. It will nevertheless be understood that no limitation of the scope of the novel invention is thereby intended, such alterations and further modifications in the illustrated devices and methods, and such further applications of the principles of the novel invention as illustrated therein being contemplated as would normally occur to one skilled in the art to which the novel invention relates.

FIG. 1 illustrates a side view of a sugarcane harvester 20 adapted to cut sugarcane 22, with the front of the harvester 20 facing to the right. Accordingly, certain components of the harvester 20 may not be visible in FIG. 1. The harvester 20 includes a cab 24 located on a main frame 26 that is supported by wheels 28 configured to move the harvester along rows of sugarcane 22. An engine is located within a housing 30 that moves the wheels 28 along a field to continually cut the sugarcane 22 for harvesting. In different embodiments, the engine also powers various driven components of the harvester 20. In certain embodiments, the engine directly powers one or more hydraulic pumps (not shown) and other driven components powered by the hydraulic motors via an embedded hydraulic system (not shown).

A cane topper 32 extends forward of the frame 26 in order to remove the leafy tops of sugarcane plants 22. A set of crop dividers 34 guides the stalks of sugarcane toward internal mechanisms of the harvester 20 for processing. As the harvester 20 moves across a field, sugarcane plants passing between the crop dividers 34 are deflected downward by one or more knockdown rollers before being cut near the base of the plants 22 by a base cutter assembly, as would be understood by one skilled in the art. Rotating disks, guides, or paddles (not shown) on the base cutter assembly further direct the cut ends of the plants upwardly and rearward within the harvester 20 toward successive pairs of upper feed rollers 36 and lower feed rollers 38. The feed rollers 36 and 38 are supported by a feed roller chassis 40 which is supported by the main frame 26. The upper and lower feed rollers 36 and 38 convey the stalks toward a chopper drum module 42 for chopping the stalks into billets.

The chopper drum module 42 includes upper and lower chopper drums that rotate in opposite directions in order to chop the moving stalks into billets, as would be understood by one skilled in the art. The billets, including crop residue, are propelled into a cleaning chamber 44 that is located at the base of a primary extractor 46. The primary extractor 46, in different embodiments, includes a powered fan to extract the crop residue, trash, and debris from the cleaning chamber 44. A loading elevator 50, with a one end located at the bottom of the cleaning zone 44, conveys the cleaned billets upward to a discharge location 52, below a secondary extractor 54, where the billets are discharged into a truck, a wagon, a container, or other receptacle that collects the discharged billets. The secondary extractor 54 separates the crop residue from the cut stalk to clean the cut stalk.

Figure 2:
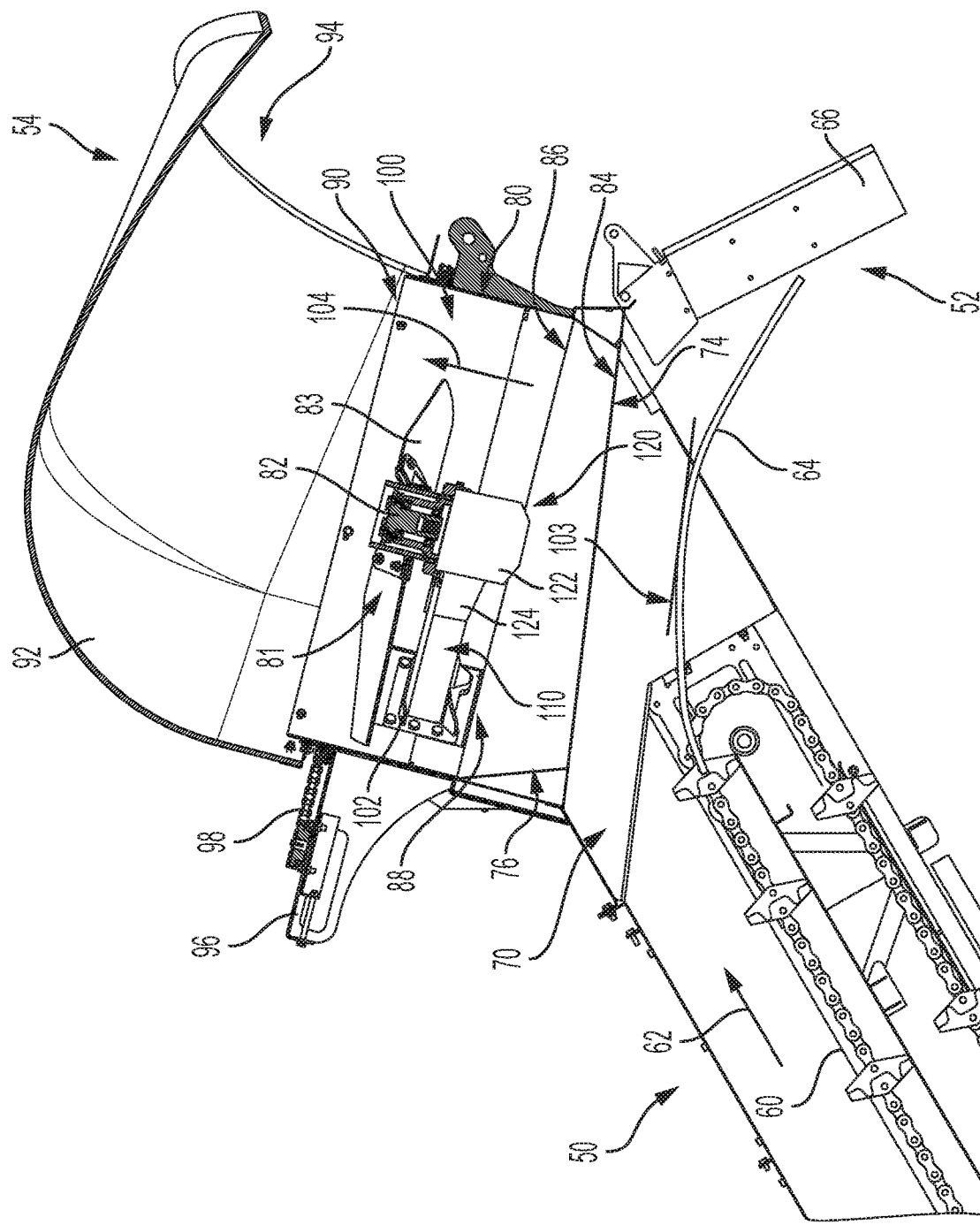
FIG. 2 illustrates a side sectional view of a secondary extractor coupled to an elevator.

FIG. 2 illustrates a sectional view of a portion of the loading elevator 50 and the secondary extractor 54 located at an end of the conveyor. The elevator 50 includes a conveyor belt 60 having a top surface moving in a direction 62 carrying billets and crop residue toward the discharge location 52. The secondary extractor 54 is located at the end of the elevator 50 and is configured to remove the crop residue from the billets that travel along a path 64. The secondary extractor 54 includes a deflector 66 that deflects billets in a generally downward direction toward the wagon.

Figure 3:
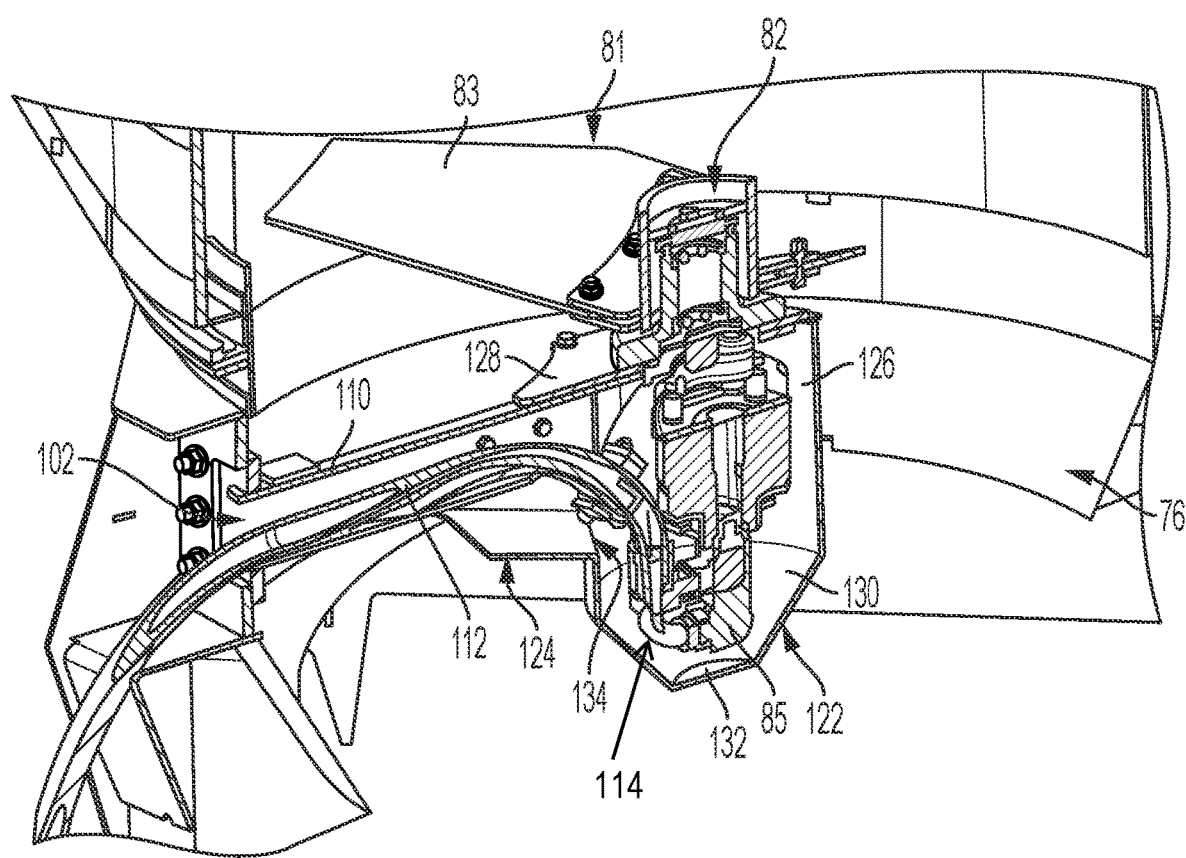
FIG. 3 illustrates a sectional perspective view of a secondary extractor including a cover assembly.

A frame 70, see also FIG. 3, is configured to couple the secondary extractor 54 to the elevator 50. The frame 70 includes a plurality of sides 71 defining an inlet 72 and a crop residue outlet 74. As the crop residue and the billets travel along the path 64, the secondary extractor 54 removes crop residue from the inlet 72 which then moves toward the crop residue outlet 74. A tapered nozzle 76 is located at the crop residue outlet 74 of the frame 70.

A fan housing 80 is located adjacently to the nozzle 76 and defines a chamber in which a fan assembly 81 is located. The fan assembly 81 is fixedly coupled to the fan housing 80 and includes a fan 82 supporting blades 83 that rotate at a speed of between 700 and 1400 revolutions per minute to extract the crop residue from the billets as the billets move along the path 64. The fan 82 includes a fan motor 85 that drives the blades 83.

The crop debris, due to weighing less than the billets, is pulled away from the billets into the crop residue outlet 74, through the nozzle 76, and into the fan housing 80. The nozzle 76 includes a nozzle inlet 84, located at the crop residue outlet 74 of the frame 70, and a nozzle outlet 86 located at a housing inlet 88 of the fan housing 80. The fan housing 80 includes an outlet 90. A hood 92 is rotatably coupled to the housing 80 at the outlet 90. Crop residue moves from the crop residue outlet 74, through the nozzle 76, through the fan housing 80, through the hood 92, and out of the hood through a hood outlet 94. A platform 96 supports a motor (not shown) that drives a chain 98 to rotate the hood with respect to the frame 70 and to direct crop residue exiting the hood outlet 92 to a preferred location.

In one embodiment, the fan housing 80 is a generally cylindrical structure defining the chamber in which the fan assembly 81 is located. In the illustrated embodiment, the housing inlet 88 and the housing outlet 90 include perimeters of the same size. In one embodiment, the housing inlet 88 and the housing outlet 90 have circumferences of the same length. Other perimeters and lengths are contemplated. In one or more embodiments, a wear ring 100 is located within the housing 80 adjacent to the fan assembly 81 to protect the interior of the housing from flying debris (crop residue and other materials). In one embodiment, the wear ring 100 is formed of a plastic material and is replaceable when worn.

In one embodiment, the nozzle 76 is located within the frame 70, as illustrated in FIG. 2, or in another embodiment within the housing 80. The nozzle inlet 84 and the nozzle outlet 86 each define an aperture having a perimeter, which in one embodiment is a circumference of a circle. The length of the perimeter of nozzle inlet 84 is less than the length of the perimeter of nozzle outlet 86 such that the nozzle 76 defines a truncated cone having a channel extending from the nozzle inlet 84 to the nozzle outlet 86. The tapered nozzle 76 restricts the flow of air at the nozzle inlet 84, which increases the flow of air provided by the fan assembly 81 to extract crop residue from the billets.

The housing 80 includes a conduit aperture 102 configured to supply operating power to the fan assembly 81. As the fan 82 rotates the blade 83, the fan generates a flow of air in a direction 104 (see FIG. 2) which provides a negative pressure to move crop residue from the path 64 and through the channel of nozzle 76.

The nozzle inlet 84 generally defines a plane which is aligned with respect to the path 64 to achieve a desired extraction of the crop residue from the billets. In one embodiment, the plane defined by the nozzle inlet 84 is generally parallel to a tangent 103 defined by the path 64 of the billets moving to the discharge location. The path 64 is parabolic in shape and its tangent is used, in one or more embodiments, to determine the angle of the nozzle inlet 84 with path 64.

In one embodiment, the nozzle inlet 84 is located in close proximity to the tangent 103 to remove crop residue from the sugarcane mat moving along the path 64. The distance of the nozzle inlet 84 to the tangent 103 is based on the speed of the fan and the size of the nozzle. In another embodiment, the nozzle is not a tapered nozzle, but is instead a generally cylindrical nozzle having a predetermined diameter with an inlet in close proximity to the path 64. In this embodiment, the generally cylindrical nozzle extends from the housing 80 into the frame 70. In one or more embodiments, the generally cylindrical nozzle includes a diameter less than a diameter of the housing 80. Other diameters are contemplated.

The distance of the nozzle inlet from the sugarcane mat at the path 64 is determined based on the speed of the fan, the size of nozzle inlet, or the size of the nozzle outlet. The distance of the nozzle from the path and the fan speed are selected to withdraw a substantial amount of crop residue from the sugarcane mat such that the remaining sugarcane billets flow along the path 64 to the deflector 66.

As seen in FIGS. 2 and 3, a support arm 110 extends laterally from in interior sidewall of the fan housing 80 and supports the fan assembly 81 including the fan 82 and blades 83 at or near a central location within the fan housing 80. The conduit aperture 102 is located at one end of the support arm 110 and provides access to a channel defined by the support arm 110. One or more electrical cables or hoses 112 (see FIG. 3) are routed though the support arm 110 and are coupled to the fan assembly 81 to power the fan 82. In particular, the fan motor 85 includes fittings 114 to which the cables or hoses 112 are connected. The support arm 110 includes an outlet through which the cable 112 extends for connection to the fan motor 85.

A cover assembly 120 is fixedly connected to the support arm 110 and includes a fan cover 122 and an arm cover 124. The fan cover 122 is fixedly coupled to the fan assembly 81 and the arm cover 124 extends from the fan cover 122 and is fixedly connected at one end thereof to the support arm 110. As seen in FIG. 3, the fan cover 122 includes a generally cylindrical portion 126 coupled to and extending from a flange 128 that is coupled to the support arm 110. The fan cover 122 includes a portion 129 configured to mate with the flange 128 and connectors 131 extending therethrough. The fan cover 122 further includes a cone 130 having an angled sidewall and terminating at a generally planar wall 132 to provide a truncated cone. In another embodiment, the cone 130 is not truncated and terminates at a point. The generally cylindrical sidewall 126 includes an aperture 134 defining a path for the cables 112 to extend from the channel of the support arm to the fan 82 where the cables 112 are connected.

Figure 4:
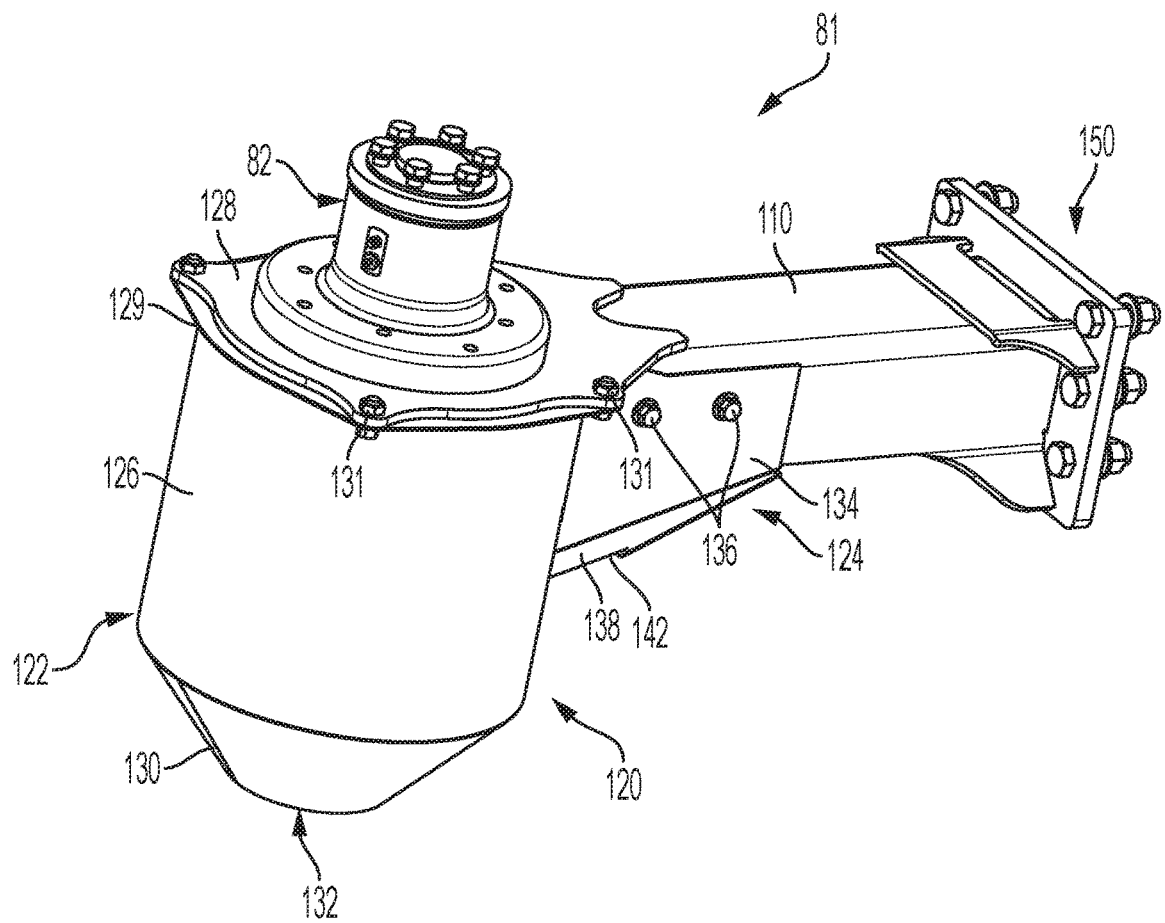
FIG. 4 illustrates a cover assembly coupled to a support arm.
Figure 5:
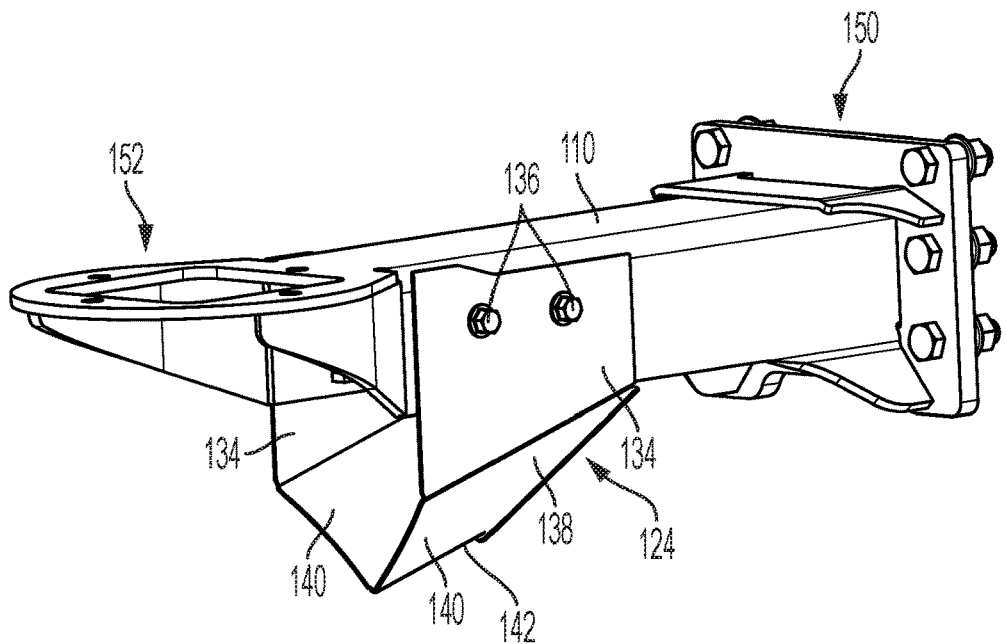
FIG. 5 illustrates a portion of a cover assembly coupled to a support arm.

As seen in FIGS. 4 and 5, the arm cover 124 subtends a portion of the support arm 110 and includes sidewalls 134 fixedly connected to the arm 110 with connectors 136. A bottom portion 138 of the arm cover 124 includes angled sidewalls 140 extending from the sidewalls 134 and connected at an edge 142. The sidewalls 134 and the angled sidewalls 140 define a cavity in the shape of a ramp through which the cables 112 extend though the aperture 134 for connection to the fan 82. The edge 142 extends downwardly from the arm 110 to the cylinder 126 to enable connection of the cables 112 to the fan 82 along the ramp defined by the arm cover 124. In addition, the edge 142 provides a leading edge directed to the flow of crop debris which deflects the crop debris away from the arm 110. The leading edge, by providing a reduced area surface upon which the crop debris can collect, reduces or prevents crop buildup at the arm 110 or the fan 82.

The arm 110 includes a first end portion 150 that is generally perpendicular to the extending length of the arm 110. The first end portion 150 is coupled to the fan housing 80. A second end portion 152 is located at a terminating end of the arm 110 and supports the fan 82 and the flange 128 to which it is coupled.

The cover assembly 120, in different embodiments, is made of one or more materials including sheet metal, rubber, plastics, or composite materials. The materials are selected based on the anticipated conditions to be experienced of the cover assembly. For instance, a cover assembly made of rubber is used. In other embodiments, the cover assembly is one part, such that the fan cover 122 and the arm cover 124 are made of a single unitary part. In other embodiments, the cover assembly 122 is an assembly of parts which are configured to be mated and connected together to form the cover assembly. For instance, the arm cover 124, the cylindrical portion 126, and the cone 130 are formed of separate but connectable parts. Additionally, it is contemplated that each of the separate parts are made of different or the same materials in one or more different embodiments.

The cover assembly 120 reduces or eliminates the accumulation of dirt and debris that tends to collect at the fan assembly 81. This reduced accumulation reduces the weight being supported by the arm 110 from the dirt and debris, and also reduces the load experienced by the fan motor and its bearings. Bearing life of the fan is improved. Additionally, the cover assembly 120 is easily assembled to and removed from the fan 82, thereby reducing the time needed for maintenance and repair.

The cover assembly 120, that covers both the fan 82 and the arm 110, improves the air flow in the secondary extractor. Additionally, the cover assembly 120 reduces or eliminates dirt, debris, or trash build up within the nozzle 76 and does not hinder the cane billet flow. The arm cover124 also prevents dirt, debris, and trash from collecting at the electrical cables or hoses 112.

The cover assembly 120 is easily connected to the arm 110 to cover the fan motor, fittings 114 and hoses. The cover assembly 120 provides a smooth exterior surface that enhances air flow through the nozzle 76, past the fan 82, and through the hood 92. The cover 120 is fixedly connected to the support arm and subtends the fan 82, and more particularly the rotary actuator of the fan 82, wherein the cover directs crop debris away from the rotary actuator of the fan.

As described herein, the velocity and direction of air flow provided by the fan is determined by one or more of fan speed, the internal volume of the tapered nozzle, the angle of the wall(s) of the tapered nozzle, the angle of the plane defined by the nozzle input with respect to the path. By knowing the speed of elevator, the velocity and direction of air flow provided by the fan and the configuration of the tapered nozzle are determined to provide for an optimum extraction of crop debris from the billets. In one embodiment, the speed of the fan is reduced when a nozzle as described herein is incorporated into a secondary extractor. A reduction in fan speed improves the lifespan of the fan while providing air flow sufficient to extract crop residue from the material being transported by the elevator. Consequently, the incorporation of a tapered nozzle provides for an optimum flow of air delivered by the fan.

While exemplary embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A separator for a crop harvester configured to harvest sugarcane, the separator comprising:
   a a fan housing including an inlet and an outlet, the inlet to receive a sugarcane mat and the outlet to receive crop debris, wherein the fan housing is generally cylindrical and defines a chamber;
   a support arm extending laterally from the fan housing, the support arm including an aperture located at the fan housing;
   a fan assembly located in the chamber and operatively connected to the support arm, wherein the fan assembly includes a fan blade and a rotary actuator to drive the fan blade to generate a flow of air in an air flow direction, wherein the support arm extends generally perpendicular to the air flow direction; and
   a cover fixedly connected to the support arm and subtending the rotary actuator, the cover including a leading edge spaced beneath the support arm to cause deflection of the crop debris away from the support arm.

2. The separator of claim 1 wherein the cover includes a housing and a ramp connected to the housing, the housing defining a cavity to house the rotary actuator and the ramp defining a raceway to direct a cable from the aperture of the support arm to a motor.

3. The separator of claim 2 wherein the housing includes a generally cylindrical portion and a cone portion fixed to the generally cylindrical portion.

4. The separator of claim 3 wherein the fan assembly includes a fitting coupled to the rotary actuator and the generally cylindrical portion includes an angled sidewall to accommodate the fitting.

5. The separator of claim 4 wherein the support arm defines an opening at a bottom portion thereof and the ramp substantially encloses the opening to direct the cable from the aperture to the opening.

6. The separator of claim 5 wherein the cover includes a flange located at an opening of the generally cylindrical portion, wherein the flange engages the support arm to fix the flange to the support arm.

7. The separator of claim 6 wherein the ramp includes a first sidewall and a second sidewall wherein each of the first sidewall and the second sidewall engage the support arm to fix the ramp to the support arm.

8. The separator of claim 7 wherein the ramp includes angled sidewalls connected to the first sidewall and to the second sidewall, wherein the angled sidewalls are connected at the leading edge.

9. A sugarcane harvester for harvesting sugarcane, the harvester comprising:
   a cutter configured to cut sugarcane into a sugarcane mat;
   a primary extractor disposed adjacent to a sugarcane mat path, the primary extractor configured to remove crop residue from the sugarcane mat moving along the sugarcane mat path;
   an elevator including a conveyor to move the sugarcane mat to an end of the conveyor;
   an extractor operatively connected to the elevator, the extractor including a generally cylindrical fan housing having a support arm extending laterally from a sidewall of the generally cylindrical fan housing and toward a center of the generally cylindrical fan housing;
   a fan assembly supported by the support arm and configured to remove crop residue from the sugarcane mat at the end of the conveyor; and
   a cover assembly fixedly connected to the support arm, wherein the cover assembly includes a leading edge spaced beneath the arm to cause deflection of the crop debris away from the support arm.

10. The sugarcane harvester of claim 9, wherein the cover assembly includes a cone portion and subtends a fan of the fan assembly, wherein the cover assembly directs crop debris away from the fan.

11. The sugarcane harvester of claim 10, wherein the cover assembly includes a housing and a ramp connected to the housing, the ramp defining a raceway to direct a cable disposed in the support arm from the support arm to a motor.

12. The sugarcane harvester of claim 11, wherein the housing includes a generally cylindrical portion and the cone portion is fixed to the generally cylindrical portion.

13. The sugarcane harvester of claim 12 wherein the fan assembly includes a fitting coupled to the fan and the generally cylindrical portion includes an angled sidewall to accommodate the fitting.

14. The sugarcane harvester of claim 13 wherein the support arm defines an opening at a bottom portion thereof and the ramp substantially encloses the opening to direct the cable from the aperture to the opening.

15. The sugarcane harvester of claim 14 wherein the cover includes a flange located at an opening of the generally cylindrical portion, wherein the flange engages the support arm to fix the flange to the support arm.

16. The sugarcane harvester of claim 15 wherein the ramp includes a first angled sidewalls wherein the angled sidewalls are connected at the leading edge.

17. A method of harvesting sugarcane from a field of sugarcane with a sugarcane harvester, the method comprising:
   cutting sugarcane from the field to obtain a sugarcane mat of cut stalk and crop residue;
   delivering the cut stalk and the crop residue adjacently to a generally cylindrical fan housing of the sugarcane harvester;
   supporting a fan with an arm extending laterally from the generally cylindrical fan housing of the sugarcane harvester and toward a center of the fan housing;
   providing an air flow through the generally cylindrical fan housing with a fan to remove the crop residue from the sugarcane mat; and
   directing the crop residue away from the fan with a cover assembly subtending the the arm, wherein the cover assembly includes a leading edge spaced beneath the arm to cause deflection of the crop residue away from the support arm.

18. The method of clam 17 further comprising routing an electrical wire through the arm and to the fan to provide power to the fan.

19. The method of claim 18 further comprising directing the crop residue away from the fan with the cover assembly.

20. The method of claim 19 wherein the directing the crop residue away from the arm with the cover assembly includes directing the crop residue away from the arm with a portion of the cover assembly configured as a ramp defining the leading edge.

* * * * *